(12) United States Patent
Shahzad et al.

(10) Patent No.: US 6,669,343 B2
(45) Date of Patent: Dec. 30, 2003

(54) IMAGE DISPLAY SYSTEM (75) Inventors: Khalid Shahzad, Shrub Oak, NY (US); Jeffrey A. Shimizu, Cortlandt Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 85 days.

(21) Appl. No.: 09/867,485

(22) Filed: May 31, 2001

(65) Prior Publication Data

US 2002/0191154 A1 Dec. 19, 2002

(51) Int. Cl.[7] .................. G03B 21/14; G03B 21/00; G02F 1/1335
(52) U.S. Cl. .............. 353/20; 353/31; 353/84; 349/9
(58) Field of Search ............. 353/20, 31, 33, 353/34, 37, 81, 88, 84; 349/5, 6, 7, 8, 9

(56) References Cited

U.S. PATENT DOCUMENTS

| 5,532,763 | A | | 7/1996 | Janssen et al. ............ 348/744 |
|---|---|---|---|---|
| 5,786,934 | A | | 7/1998 | Chiu et al. ............... 359/494 |
| 5,833,338 | A | * | 11/1998 | Barak ....................... 353/20 |
| 6,023,309 | A | | 2/2000 | Gogna et al. .............. 349/42 |
| 6,052,165 | A | | 4/2000 | Janssen ..................... 349/84 |
| 6,176,586 | B1 | * | 1/2001 | Hirose et al. ............. 353/31 |
| 6,208,463 | B1 | * | 3/2001 | Hansen et al. ............ 359/486 |
| 6,224,215 | B1 | | 5/2001 | Maximus et al. .......... 353/20 |
| 6,234,634 | B1 | | 5/2001 | Hansen et al. ............ 353/20 |
| 6,262,851 | B1 | * | 7/2001 | Marshall .................. 359/634 |
| 6,280,034 | B1 | * | 8/2001 | Brennesholtz ............ 353/20 |
| 6,394,606 | B1 | * | 5/2002 | Miyawaki et al. ........ 353/20 |
| 6,402,323 | B1 | * | 6/2002 | Shiue et al. .............. 353/20 |
| 6,439,725 | B1 | * | 8/2002 | Na ........................... 353/31 |
| 6,511,183 | B2 | * | 1/2003 | Shimizu et al. .......... 353/20 |
| 2002/0101659 | A1 | * | 8/2002 | Hansen et al. ........... 359/486 |

FOREIGN PATENT DOCUMENTS

| EP | 0848274 A1 | 6/1998 | ............ G02B/27/28 |
|---|---|---|---|
| EP | 0977442 A2 | 2/2000 | ............ H04N/9/31 |
| WO | WO0065845 | 11/2000 | ............ H04N/9/31 |

OTHER PUBLICATIONS

Y. Itoh et al., "Ultra–High–Efficiency LC Projector Using a Polarized Light Illuminating System." *1997 Society of Information Display Digest*. pp. 993–996. 1997.

J.A. Shimizu, "Single Panel Reflective LCD Projector." *Projection Displays V, Proceedings SPIE*, vol. 3634, pp. 197–206. 1999.

Digital Display Working Group, "Digital Visual Interface," Apr. 2, 1999, pp. 1–76.

* cited by examiner

*Primary Examiner*—Russell Adams
*Assistant Examiner*—Melissa J Koval (57) ABSTRACT

An image display system utilizes primarily non-absorptive polarization components to polarize light illuminating an imaging device. The non-absorptive polarization components reduce cost and cooling requirements, increase durability, and permit the use of high powered light sources.

22 Claims, 6 Drawing Sheets

IMAGE DISPLAY SYSTEM

BACKGROUND OF THE INVENTION

1) Field of the Invention

This invention pertains to the field of image display systems, and more particularly to image projectors employing liquid crystal light valves.

2) Description of the Related Art

Projection-type image display systems are widely known. Examples of such systems, and in particular systems using liquid crystal light valves, are shown in U.S. Pat. Nos. 5,532,763, 5,786,934, 6,224,215 and 6,234,634 the entirety of each of which is hereby incorporated by reference for all purposes as if fully set forth herein. With reference to the following description, familiarity with conventional features of such systems will be assumed, so that only features bearing on the present invention will be described.

Figure 1:
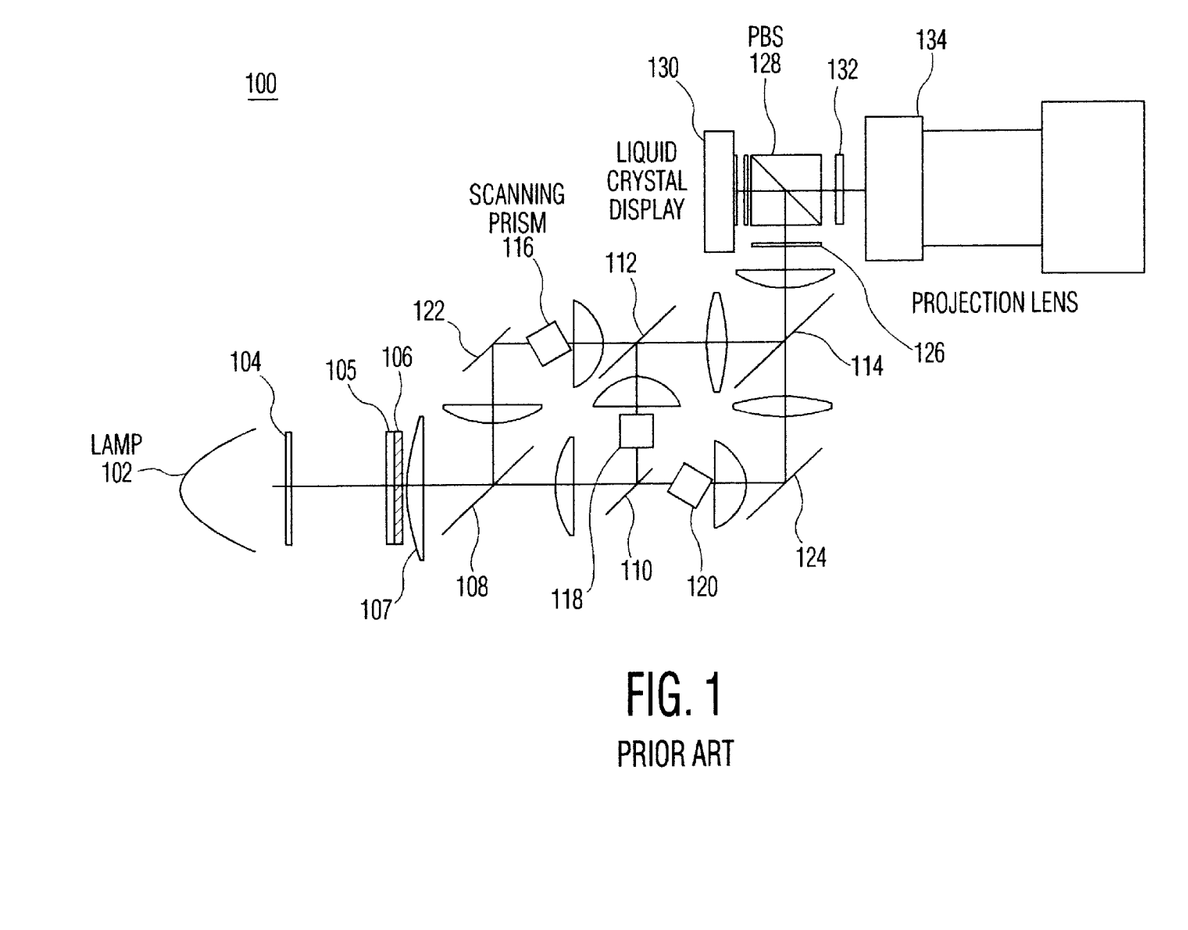
FIG. 1 shows a related art LCD projector.

FIG. 1 shows relevant portions of an exemplary liquid crystal display (LCD) projector 100. The LCD projector 100 is a single panel color LCD projector.

The LCD projector 100 comprises in relevant part: a lamp 102; a first integrator 104; a second integrator 105; a polarization conversion system (PCS) 106; a condenser lens 107; first through fourth dichoic color filters 108, 110, 112 and 114; first to third scanning prisms 116, 118 and 120; reflecting mirrors 122 and 124; pre-polarizer 126; polarizing beam splitter 128; LCD 130; analyzer 132; and projection lens 134.

The operation of the LCD projector 100 will now be explained. The LCD device 130 operates as a light valve or modulator and is adapted to receive an incident light and to impress a desired image upon the incident light which is then projected by the projection lens 134 onto a desired display area or screen. To produce a high quality image with a high contrast ratio, the LCD 130 requires that the incident light be substantially linearly polarized in a predefined direction. In the LCD projector 100, the LCD device 130 is preferably a reflective-type LCD device such as a liquid crystal on silicon (LCOS) device. The operation of reflective-type LCD devices is well known, and may be found, for example in U.S. Pat. Nos. 6,023,309 and 6,052,165.

The exemplary LCD projector 100 shown in FIG. 1 employs a scrolling color system. In a scrolling color system, white light is split into constituent red (R), green (G), and blue (B) colored light beams. The colored light beams illuminate the LCD panel as spatially separated stripes of light. The stripes of light scroll across the LCD from top to bottom. As one color scrolls off the bottom of the LCD, it appears immediately again at the top. All three colors (R, G and B) are present on the LCD at all times.

To create the color image, the LCD is effectively addressed at three different places simultaneously. Data for a given color (e.g., green), is written to a row just after the passing of the previous color (e.g., blue). The (green) band of colored light then illuminates the pixel. The panel is addressed at three places and these address rows shift downward in sync with the illumination pattern. A more detailed explanation of the operation of the scrolling color architecture may be found in "Single Panel Reflective LCD Projector," J. A. Shimizu, Projection Displays V, Proceedings SPIE, Vol. 3634, pp. 197–206, (1999), the entirety of which is hereby incorporated by reference for all purposes as if fully set forth herein.

Turning once again to FIG. 1, the lamp 102 produces a high intensity, generally unpolarized light. The integrator 104 receives the light from the lamp 102 and shapes and homogenizes the distribution of the light to produce a generally rectangular beam. The integrators 104 and 105 are typically each comprised of a lens array. The integrators 104 and 105 produce multiple secondary light source images in a focal plane, F.

The PCS 106 is located in the focal plane F of the integrators and serves to substantially linearly polarize the light incident thereon.

Figure 2:
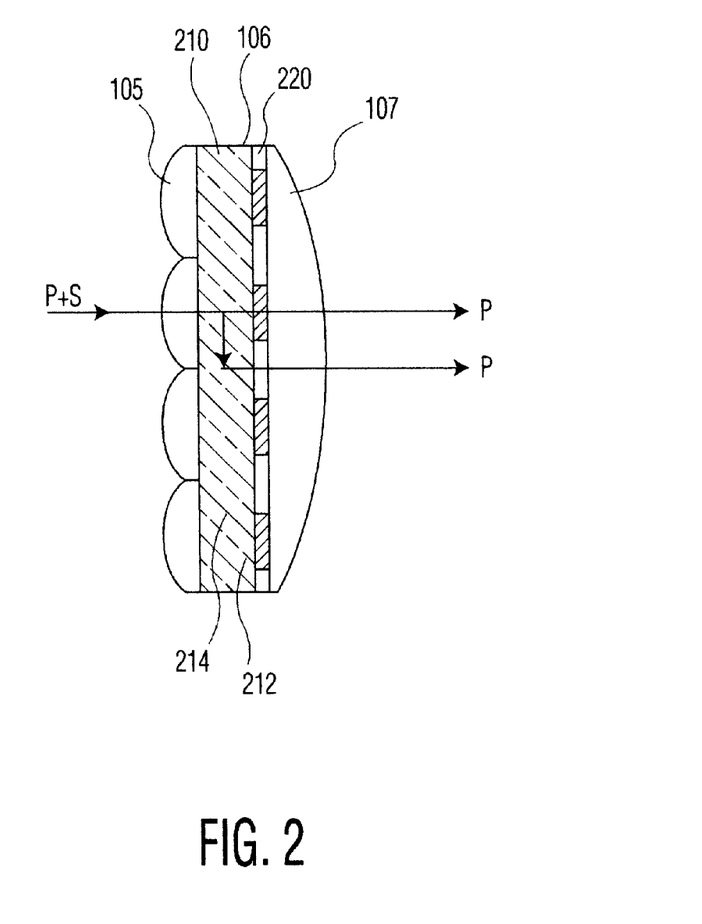
FIG. 2 shows an embodiment of an integrator, polarization conversion system, and condenser lens.

FIG. 2 shows one embodiment of an integrator 105, a PCS 106, and a condenser lens 107 that may be used in the LCD projector 100. The integrator 105 comprises a lens array. The PCS 106 comprises a polarizing beam splitter array 210 and a half wave plate 220. The polarizing beam splitter array 210 includes an alternating arrangement of polarizing beam splitters 212 and mirrors 214.

The PCS 106 is adapted to receive generally unpolarized light and to convert the generally unpolarized incident light into linearly polarized light, "P." The polarized light may then be passed out through the condenser lens 107. In contrast to a standard absorbing polarizer, which passes only roughly 50% of light incident thereon having a desired polarization (e.g., "P"), and which absorbs roughly 50% of the light incident thereon having an undesired polarization (e.g., "S"), the PCS 106 typically passes a much higher percentage of incident light than a polarizer (e.g., 80% of incident light) and absorbs a small fraction of the light energy typically absorbed in an absorbing polarizer. Thus, the PCS 106 may be used to polarize light in high intensity applications (e.g., greater than about several hundred lumens) where a standard absorbing polarizer cannot be used because the absorbed light energy would destroy it. On the other hand, the extinction ratio (Tp/Ts) for the PCS 106 is typically substantially lower than that for an absorbing polarizer, meaning the output light has a lower degree of polarization. An extinction ratio for a typical PCS 106 is less than 10 (e.g., 8.25).

In addition to polarizing the received light beam, the combination of polarizing beam splitter 212, adjacent mirror 214, and half wave plate 220 in the PCS 106 roughly doubles the etendue, or optical size, of the light beam. That is, the PCS 106 roughly doubles the etendue of an illumination system into which it is incorporated.

A more detailed explanation of the operation of the PCS 106 may be found in "Ultra-High-Efficiency LC Projector Using a Polarized Light Illuminating System," Y. Itoh et al., 1997 Society of Information Display Digest, pp. 993–996 (1997), the entirety of which is hereby incorporated by reference for all purposes as if fully set forth herein.

Turning again to FIG. 1, the substantially polarized light from the PCS 106 is passed through the dichoic color filters 108 and 110 to separate the polarized light into a plurality of different colored light beams (e.g., three, labeled "R," "G," and "B"). Each of the colored light beams, red, green and blue, is provided to a corresponding rotating prism 116, 118, or 120, for scanning the color beam onto the LCD 130 in the scrolling color system. The dichoic color filters 112 and 114 direct the plurality of colored light beams to the pre-polarizer 126.

The pre-polarizer 126 increases the extinction ratio of the colored light beams incident thereon to provide very highly polarized light to the LCD 130. The pre-polarizer has in its plane both an absorbing direction and a non-absorbing direction, the absorbing direction being perpendicular to the non-absorbing direction. Light having a desired polarization "P" along the non-absorbing direction of the pre-polarizer 126 passes through the pre-polarizer 126 to the polarizing beam splitter 128, and the remaining light is generally absorbed by the polarizer. The polarizer, being a non-ideal device, has a finite extinction ratio, and thus a small amount of the colored light beams having the undesired "S" polarization passes through the device.

The substantially polarized colored light beams from the pre-polarizer 126 are supplied to the polarizing beam splitter 128. The polarizing beam splitter 128 directs the substantially polarized colored light beams to the LCD device 130. Meanwhile, a small remnant of the colored light beams having the undesired "S" polarization is directed away from the LCD device 130 by the beam splitter 128 (e.g., passes through the device).

As briefly described above, the LCD device 130 imparts desired image information on the substantially polarized colored beams by modulating the polarization of the incident light and reflecting the imaged light back to the polarizing beam splitter 128.

The polarizing beam splitter 128 directs the imaged light from the LCD device 130 having a desired polarization "S" to the analyzer 132, while directing reflected light from the LCD device 130 having an undesired polarization "P" away from the analyzer 132. The analyzer 132 further polarizes the imaged light incident thereon and provides the imaged light to the projection lens 134.

Finally, the projection lens 134 magnifies and projects the imaged light onto a desired display area or screen.

While this related art LCD projector is satisfactory for projecting an image, it has several limitations. The PCS is very costly and complicated to manufacture. Moreover, as explained above, the PCS doubles the etendue of the illumination system, roughly doubling the size of the LCD that is needed to capture the light beam. The PCS gets very hot and requires cooling, decreasing overall system durability. The pre-polarizer also requires active cooling to prolong its lifetime, further affecting system durability. Also, the PCS is not suitable for higher power light sources (e.g., much greater than 1000 watts) used for high intensity projectors (e.g., greater than 1000 lumens) as the amount of light energy absorbed by the PCS will cause the device to fail.

Accordingly, it would be desirable to provide an image display system suitable for high power projectors, which is more durable, which has less stringent cooling requirements, and preferably which includes less complicated and costly polarizing elements. Other and further objects and advantages will appear hereinafter.

SUMMARY OF THE INVENTION

Therefore, in one aspect, the invention provides an image display system suitable for high intensity applications.

Accordingly, an image display system is provided having: an image display system, comprising: a light source emitting substantially unpolarized light; means for separating the substantially unpolarized light into a plurality of colored light beams; a polarizing element adapted to receive at least one of the colored light beams, to direct in a first direction a first portion of the one colored light beam having substantially a first polarization, and to direct in a second direction a second portion of the one colored light beam having substantially a second polarization; an imager adapted to impart image information on at least the one colored light beam; a projection lens adapted to project imaged light; and a polarizing beam splitter adapted to direct the first portion of the one colored light beam from the polarizing element to the imager, and to direct the imaged light from the imager to the projection lens.

DETAILED DESCRIPTION

Figure 3:
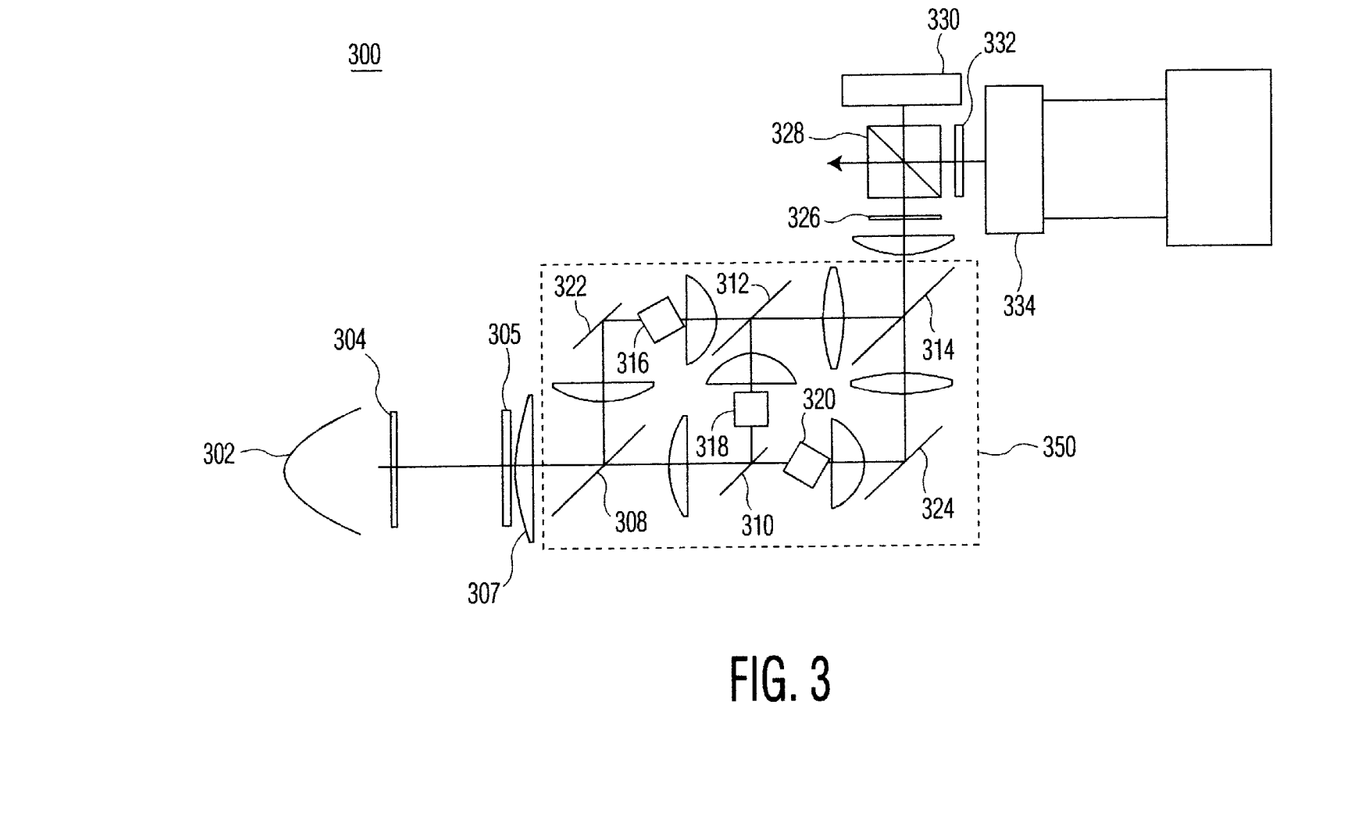
FIG. 3 shows a first embodiment of an image display system.

FIG. 3 shows a first embodiment of an image display system 300 in accordance with one or more aspects of the invention. For clarity and simplicity, those portions of the system relating to the present invention are illustrated.

The image display system 300 comprises in relevant part: a light source 302; first and second integrators 304 and 305; a condenser lens 307; color separating means 350; a substantially non-absorptive polarizing element 326; a polarizing beam splitter 328; an imager 330; an analyzer 332; and a projection lens 334.

The operation of various pertinent elements of the first preferred embodiment image display system 300 will now be explained. The image display system 300 shown in FIG. 3 employs a scrolling color scheme as described above, wherein the imager 330 operates as a light valve or modulator and is adapted to receive an incident light and to impress a desired image upon the incident light which is then projected by the projection lens 334 onto a desired display area or screen.

The light source 302, which may be a lamp, produces a high intensity, generally unpolarized light. The integrator 304 receives the light from the lamp 302 and shapes and homogenizes the distribution of the light to produce a generally rectangular beam. The integrators 304, 305 may each comprise a lens array.

The substantially unpolarized light from the integrators is passed through the color separating means 350 for separating the substantially unpolarized light into a plurality of colored light beams. In the image display system 300, the color separating means 350 comprises the dichoic color filters 308, 310, 312 and 314, the rotating prisms 316, 318, and 320, and the reflecting mirrors 322 and 324.

The substantially unpolarized colored light beams from the color separating means 350 are supplied to the substantially non-absorptive polarizing element 326.

The substantially non-absorptive polarizing element 326 receives the incident substantially unpolarized colored light beams from the color separating means 350 and passes a first portion of the received colored light beams, having a desired polarization (e.g., "P"), and reflects a substantial majority of the remainder of the incident light, having an undesired polarization (e.g., "S"). Beneficially, the polarizing element 326 passes roughly 50% of the incident colored light beams, and reflects roughly 50% of the incident colored light beams. Accordingly, only a small percentage of the high intensity light incident on the polarizing element 326 is absorbed by it, reducing the need for cooling the device and increasing the durability of the image display system 300.

Beneficially, the substantially non-absorptive polarizing element 326 may comprise a polarizing beam splitter, a reflecting polarizer, or a broadband wire grid polarizer. An exemplary reflecting polarizer is disclosed in U.S. Pat. No. 6,025,897, and an exemplary broadband wire grid polarizer is disclosed in U.S. Pat. No. 6,122,103.

The polarizing element 326 directs the portion of the colored light beams having the desired polarization (e.g., "P") to the polarizing beam splitter 328. The polarizing beam splitter 328 directs the substantially linearly polarized colored light beams to the imager 330. Meanwhile, a small remnant of the colored light beams having the undesired (e.g., "S") polarization is directed away from the imager 330 by the beam splitter 328.

Beneficially, the imager 330 is a liquid crystal light valve, such as a reflective liquid crystal display (LCD) device, as briefly described above. The imager 330 imparts desired image information on the substantially linearly polarized colored beams by modulating the polarization of the incident light and reflecting the imaged light back to the polarizing beam splitter 328.

The polarizing beam splitter 328 directs the imaged light from the imager 330 having a desired linear polarization (e.g., "S") to the analyzer 332, while directing reflected light from the imager 330 having an undesired polarization (e.g., "P") away from the analyzer 332. The analyzer 332 further polarizes the imaged light incident thereon and provides the imaged light to the projection lens 334.

Finally, the projection lens 334 magnifies and projects the imaged light onto a desired display area or screen.

In a variation on the first embodiment image display system 300, instead of locating the substantially non-absorptive polarizing element 326 between the color separating means 350 and the polarizing beam splitter 328, it may be located between the integrator 304 and the color separating means 350. In that case, the color separating means 350 receives substantially polarized light from the substantially non-absorptive polarizing element 326.

Because the first embodiment image display system 300 does not employ a PCS or pre-polarizer, the cost is reduced, the cooling requirements are reduced, and the durability is increased, compared with the prior art systems. Also, the elimination of the PCS reduces the etendue of the illuminating optics, compared with the prior art systems, allowing for a reduction in the size of the imager (e.g., LCD device) used in the system, thereby further reducing the cost—and size—of the image display system. Further, the elimination of the absorptive pre-polarizer and PCS permit the use of higher powered light sources which would destroy these devices. For example, the light source 304 may be a lamp of 1 kW or greater power, producing a projected light intensity of over 1000 lumens.

Figure 4:
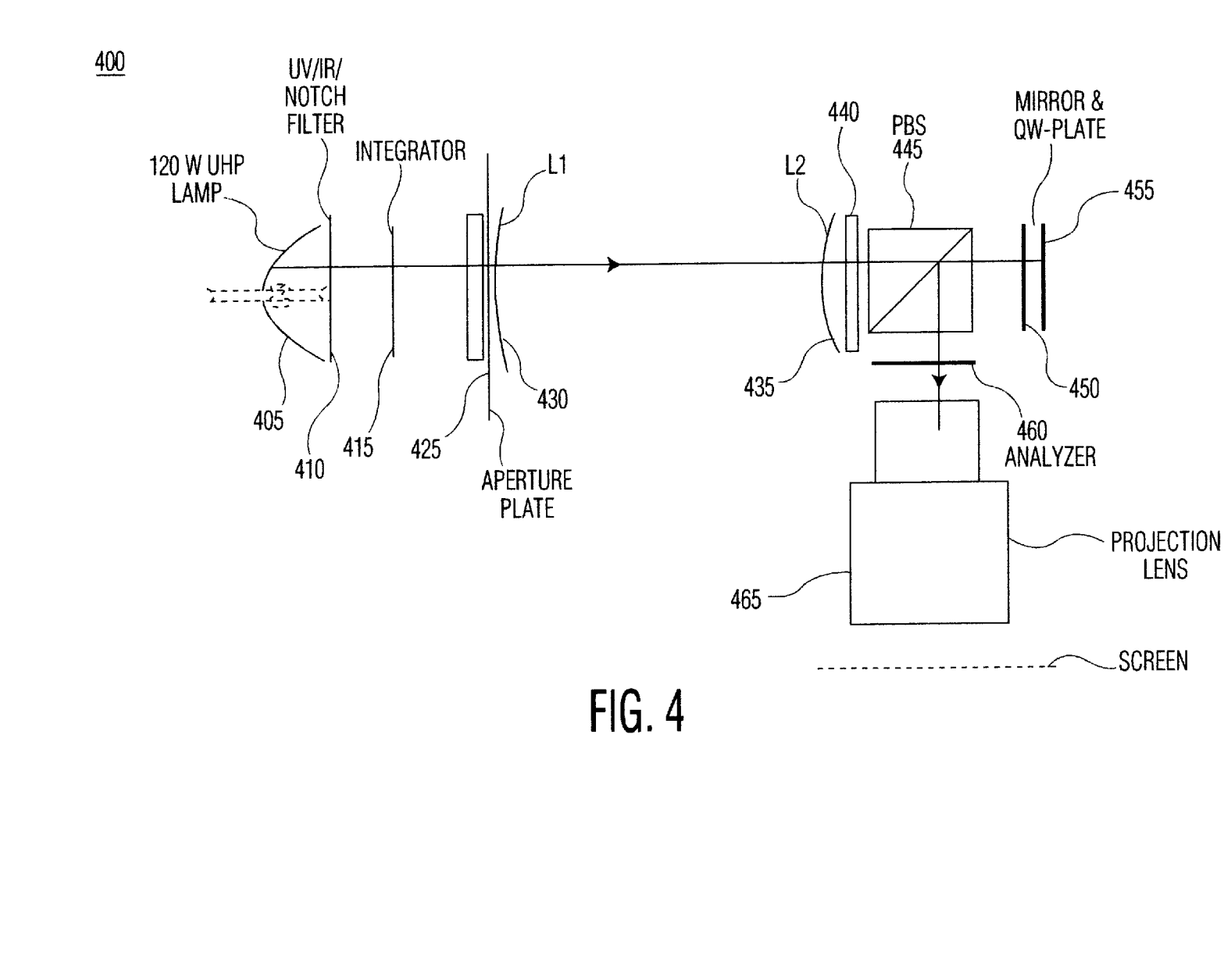
FIG. 4 shows a testbed display system employed to determine the effect of various polarizing elements on the contrast ratio of a displayed image.

To determine the relationship between the extinction ratio of light provided to the polarizing beam splitter in an image display system, and the contrast ratio of an image displayed by the system, the testbed 400 illustrated in FIG. 4 was employed. The testbed 400 includes: a light source 405; a filter 410; integrator 415; first test element 425; first and second lenses 430, 435; second test element 440; polarizing beam splitter 445; quarter-wave plate 450; mirror 455; analyzer 460; and projection lens 465.

Various combinations of components, including a polarization conversion system (PCS), a pre-polarizer, a reflective polarizer, and a broadband wire grid polarizer, were substituted for the test elements 425 and 440 in FIG. 4. Then, the extinction ratio of the polarized light incident on the polarizing beam splitter 445 and the intensity and contrast of the light output of the projection lens 465 were measured for each combination of selected elements.

Table 1 shows the extinction ratio at the input of the polarizing beam splitter 445 and the corresponding display brightness and the display contrast which were produced when various components were used for first and second test elements 425 and 440.

TABLE 1

| Element 425 | Element 440 | Extinction Ratio | Display Brightness (Lumens) | Display Contrast |
|---|---|---|---|---|
| PCS | Pre-polarizer | 530 | 505 | 850 |
| None | None | 1 | 498 | 267 |
| None | Wire Grid Polarizer | 787 | 465 | 950 |
| None | Reflecting polarizer | 171 | 488 | 705 |
| PCS | None | 8.25 | 594 | 692 |

Figure 5:
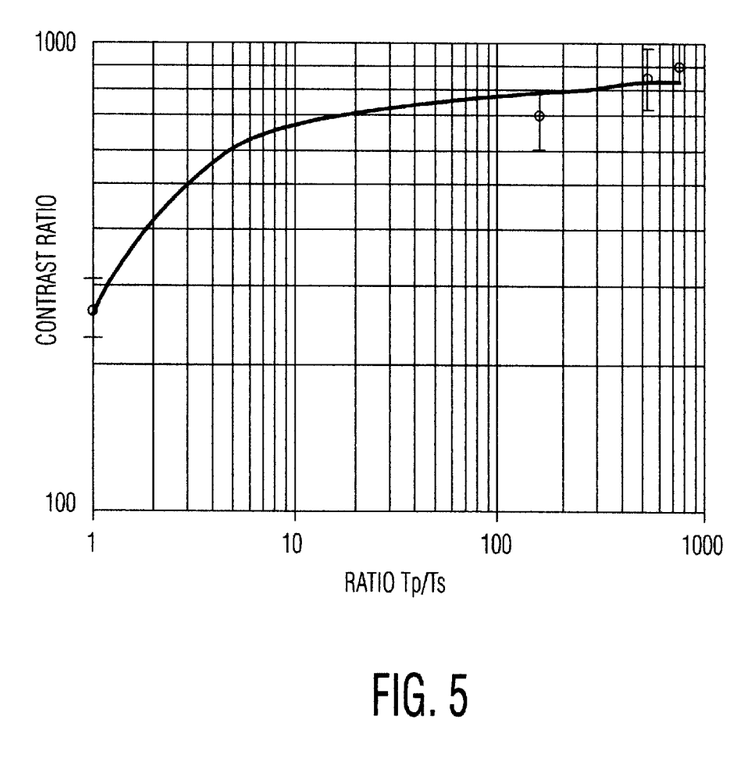
FIG. 5 illustrates the relationship between extinction ratio incident to the polarizing beam splitter of the testbed display system of FIG. 4, and the contrast ratio of the image displayed by the system.

FIG. 5 shows a best fit plot of the relationship between extinction ratio incident to the polarizing beam splitter 445 of FIG. 4, and the contrast ratio of the image displayed by the set-up. Examining FIG. 5, one can see that there is approximately a 150% improvement (increase) in the contrast ratio as the extinction ratio is increased from 1 to 10. However, a further increase in the extinction ratio from 10 to 100 only produces a further improvement in the contrast ratio of about 16%, and an increase on the extinction ratio from 10 to 800 only produces an improvement in the contrast ratio of about 37%.

Accordingly, it has been determined that in some applications, an image display system may achieve high output efficiency and acceptable contrast by employing a polarization conversion system (PCS) and no other polarizing element in the path of the illumination optics before the polarizing beam splitter.

Figure 6:
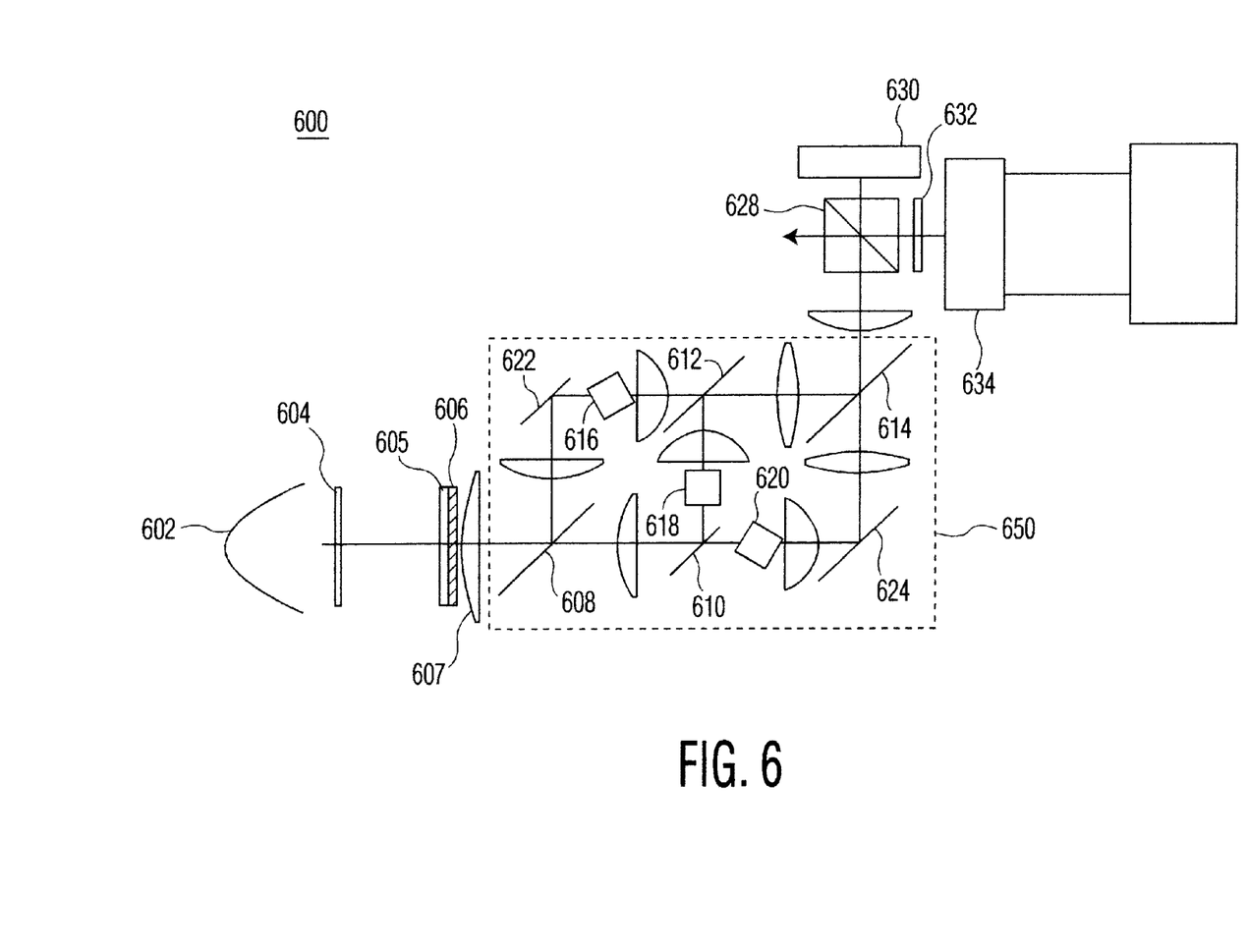
FIG. 6 shows a second embodiment of an image display system.

FIG. 6 shows a second preferred embodiment image display system 600 in accordance with one or more aspects of the invention. For clarity and simplicity, those portions of the system relating to the present invention are illustrated.

The image display system 600 comprises in relevant part: a light source 602; first and second integrators 604, 605; a polarization conversion system (PCS) 606; a condenser lens 607; color separating means 650; a polarizing beam splitter 628; an imager 630; an analyzer 632; and a projection lens 634.

The operation of various pertinent elements of the first preferred embodiment image display system 600 will now be explained. The image display system 600 shown in FIG. 6 employs a scrolling color scheme as described above, wherein the imager 630 operates as a light valve or modulator and is adapted to receive an incident light and to impress a desired image upon the incident light which is then projected by the projection lens 634 onto a desired display area or screen.

The light source 602, which may be a lamp, produces a high intensity, generally unpolarized light. The integrator 604 receives the light from the lamp 602 and shapes and homogenizes the distribution of the light to produce a generally rectangular beam. The integrators 604, 605 may each comprise a lens array.

The PCS 606 is adapted to substantially linearly polarize the light incident thereon. The PCS 606 is adapted to receive generally unpolarized light and to convert the generally unpolarized incident light into substantially polarized light having a desired linear polarization (e.g., "P.")

The substantially polarized light from the PCS 606 is passed through a color separating means 650 for separating the substantially polarized light into a plurality of colored light beams. In the image display system 600, the color separating means 650 comprises the dichoic color filters 608, 610, 612 and 614, the rotating prisms 616, 618, and 620, and the reflecting mirrors 622 and 624.

The substantially polarized colored light beams from the color separating means 650 are supplied to the polarizing beam splitter 628. The polarizing beam splitter 628 directs the substantially polarized colored light beams to the imager 630. Meanwhile, a small remnant of the colored light beams having the undesired (e.g., "S") polarization is directed away from imager 630 by the beam splitter 628.

Beneficially, the imager 630 is a liquid crystal light valve, such as a reflective liquid crystal display (LCD) device, as briefly described above. The imager 630 imparts desired image information on the substantially polarized colored beams by modulating the polarization of the incident light and reflecting the imaged light back to the polarizing beam splitter 628.

The polarizing beam splitter 628 directs the imaged light from the imager 630 having a desired polarization (e.g., "S") to the analyzer 632, while directing reflected light from the imager 630 having an undesired polarization (e.g., "P") away from the analyzer 632. The analyzer 632 further polarizes the imaged light incident thereon and provides the imaged light to the projection lens 634.

Finally, the projection lens 634 magnifies and projects the imaged light onto a desired display area or screen.

Because the second embodiment image display system 600 does not include any pre-polarizer, the system is more durable and easier to cool. Also, as can be seen in Table 1, the output light intensity is increased compared with a system which includes a pre-polarizer.

While preferred embodiments are disclosed herein, many variations are possible which remain within the concept and scope of the invention. For example, the first and second embodiments disclosed herein are single panel scrolling color LCD projector systems. However, the principles of the present invention should not be limited to such systems, and can be applied, for example, to 3-panel color LCD projectors, and similar image display systems. Such variations would become clear to one of ordinary skill in the art after inspection of the specification, drawings and claims herein. Accordingly, the invention therefore is not to be restricted except within the spirit and scope of the appended claims.

What is claimed is:

1. An image display system, comprising:
   a light source emitting substantially unpolarized light;
   means for separating the substantially unpolarized light into a plurality of colored light beams;
   a polarizing element adapted to receive at least one of the colored light beams, to direct in a first direction a first portion of the one colored light beam having substantially a first polarization, and to direct in a second direction a second portion of the one colored light beam having substantially a second polarization;
   an imager adapted to impart image information on at least the one colored light beam and produce imaged light;
   a projection lens adapted to project the imaged light; and
   a polarizing beam splitter adapted to direct the first portion of the one colored light beam from the polarizing element to the imager, and to direct the imaged light from the imager to the projection lens.

2. The image display system of claim 1, wherein the imager comprises a light valve adapted to modulate the one colored light beam to impart image information thereon.

3. The image display system of claim 2, wherein the light valve comprises a reflective liquid crystal display device.

4. The image display system of claim 1, wherein the polarizing element comprises a reflective polarizer.

5. The image display system of claim 1, wherein the polarizing element comprises a second polarizing beam splitter.

6. The image display system of claim 1, wherein the polarizing element comprises a wire grid polarizer.

7. The image display system of claim 1, wherein the polarizing beam splitter is adapted to further polarize the first portion of the one colored light beam received from the polarizing element before providing the one colored light beam to the imager.

8. The image display system of claim 1, wherein the first and second portions of the one colored light beam each comprise approximately 50% of the one colored light beam.

9. (currently amended) An image display system, comprising:
   a light source emitting light;
   a non-absorptive polarizing element adapted to receive the light, to direct in a first direction a first portion of the light having a first polarization, and to direct in a second direction a second portion of the light having a second polarization;
   an imager adapted to impart image information on the first portion of the light having a first polarization and produce imaged light;
   a projection lens adapted to project the imaged light; and
   a polarizing beam splitter adapted to direct the first portion of the light having a first polarization to the imager, and to direct the imaged light from the imager to the projection lens.

10. The image display system of claim 9, further comprising color separating means adapted to separate the light from the light source into a plurality of colored light beams, and to provide the light comprising the colored light beams to the non-absorptive polarizing element.

11. The image display system of claim 10, wherein the light emitted by the light source and separated by the color separating means is substantially unpolarized.

12. The image display system of claim 9, further comprising color separating means adapted to separate the first portion of the light from the non-absorptive polarizing element into a plurality of colored light beams, and to provide the first portion of the light comprising the colored light beams to the polarizing beam splitter.

13. The image display system of claim 12, wherein no other polarizing element is disposed between the color separating means and the polarizing beam splitter.

14. The image display system of claim 9, wherein the first and second portions of the light each comprise approximately 50% of the light.

15. The image display system of claim 9, wherein the imager comprises a light valve adapted to modulate the one colored light beam to impart image information thereon.

16. The image display system of claim 9, wherein the light valve comprises a reflective liquid crystal display device.

17. The image display system of claim 9, wherein the polarizing element comprises a reflective polarizer.

18. The image display system of claim 9, wherein the polarizing element comprises a second polarizing beam splitter.

19. The image display system of claim 9, wherein the polarizing element comprises a wire grid polarizer.

20. An image display system, comprising:
   a light source emitting substantially unpolarized light;
   a polarization conversion system adapted to receive the substantially unpolarized light and convert the substantially unpolarized light to substantially polarized light;
   a light valve adapted to receive a first portion of the substantially polarized light and provide modulated light; and
   a polarizing beam splitter adapted to direct the first portion of the substantially polarized light to the light valve, and to direct the modulated light from the light valve in a predetermined direction,
   wherein the first portion of the substantially polarized light from the polarization conversion system is supplied directly to the polarizing beam splitter.

21. The image display system of claim 20, further comprising color separating means adapted to separate the substantially polarized light from the polarization conversion system into a plurality of colored light beams, and to provide the substantially polarized light comprising the colored light beams to the polarizing beam splitter.

22. The image display system of claim 20, wherein the light valve comprises a reflective liquid crystal display device.

* * * * *